(12) United States Patent
Rogers et al.

(10) Patent No.: US 6,210,046 B1
(45) Date of Patent: Apr. 3, 2001

(54) FIBER OPTIC CONNECTOR WITH MICRO-ALIGNABLE LENS HAVING AUTOFOCUS FEATURE AND ASSOCIATED FABRICATION METHOD

(75) Inventors: Mark D. Rogers, Ballwin; John M. Haake, St. Charles, both of MO (US)

(73) Assignee: McDonnell Douglas Corporation, Saint Louis, MO (US)

( * ) Notice: Subject to any disclaimer, the term of this patent is extended or adjusted under 35 U.S.C. 154(b) by 0 days.

(21) Appl. No.: 09/223,033

(22) Filed: Dec. 30, 1998

(51) Int. Cl.$^7$ .................................................. G02B 6/38
(52) U.S. Cl. .................................................. 385/74
(58) Field of Search .................... 385/74, 33, 34, 385/70, 71, 73, 55

(56) References Cited

U.S. PATENT DOCUMENTS

| | | | |
|---|---|---|---|
| 5,870,518 | 2/1999 | Haake et al. | 385/90 |
| 5,881,198 | 3/1999 | Haake | 385/136 |
| 5,892,868 | 4/1999 | Peck, Jr. et al. | 385/34 |

OTHER PUBLICATIONS

Dhuler, V. et al., "Microsystems for Three Axis Active Fiber Alignment", paper presented at Solid–State Sensor and Actuator Workshop, Hilton Head Island, South Carolina, Jun. 8–11, 1998, pp. 277–280.

"MEMS Active Fiber Microactuator", Semiconductor International, Dec. 1997, p. 32.

Primary Examiner—Frank G. Font
Assistant Examiner—Reginald A. Ratliff
(74) Attorney, Agent, or Firm—Westerlund & Powell, P.C.

(57) ABSTRACT

A fiber optic connector and an associated fabrication method where the connector has a connector housing having a base side, a and pair of sidewalls upstanding from the base side that are spaced apart in relation to each other, and each of the housing sidewalls define at least one aperture through which optical signals can be transmitted into and out of the housing by an input optical fiber and an output optical fiber, respectively, located in fixed positions outside the housing, and a unitary optical lens element is contained within the housing and is located between the housing apertures, wherein the optical lens is comprised of two segments optically bonded along confronting respective lens segment surfaces at an oblique angle effective to be able to transmit collimated light from the input fiber to the output fiber and reflect transmitted light reflected back from the output fiber to a photodetector integrally attached to the lens element and positioned to receive light reflected from the confronting respective lens segment surfaces. The light transmitted through the lens element is precisely aligned with respective optical fibers within submicron tolerances using an internally-housed micro-aligner. As a result, the fiber optic connector of the present invention can provide efficient coupling between optical fibers, such as optical fibers in two spliced composite parts.

11 Claims, 6 Drawing Sheets

FIBER OPTIC CONNECTOR WITH MICRO-ALIGNABLE LENS HAVING AUTOFOCUS FEATURE AND ASSOCIATED FABRICATION METHOD

GOVERNMENT RIGHTS

This invention was made under U.S. Army Research Office government contract no. DAAH04-95-C-0007. The government may have certain rights to this invention.

FIELD OF THE INVENTION

The present invention relates generally to fiber optic connectors and associated fabrication methods and, more particularly, to fiber optic connectors especially useful for making precisely aligned optical connections between embedded optical fibers at a structural splice in a composite structure.

BACKGROUND OF THE INVENTION

Fiber optic connectors are commonly employed to align and to interconnect one or more optical fibers with a variety of optical devices or with other optical fibers. For example, fiber optic connectors can be mounted on end portions of a pair of fiber optic cables, each of which include a number of optical fibers. The optical fibers of the fiber optical cables can, for example, transmit data or control signals between various remote devices, such as sensors or actuators, and a central control computer, such as a flight controller of an aircraft. The fiber optic connectors can then be interconnected such that the optical fibers of a first fiber optic cable are aligned with the optical fibers of a second fiber optic cable.

In order to efficiently transmit signals between optical fibers, the fiber optic connectors must precisely align the individual optical fibers such that the optical signals transmitted therethrough are efficiently coupled from fiber to fiber. Such alignment is particularly essential in connecting single mode optical fibers which generally have a light transmitting core of approximately 2–10 micrometers in diameter and which must be precisely aligned with the light-transmitting core of another single mode optical fiber of similar size in order to efficiently transmit optical signals therethrough.

In order to effectively couple optical signals from fiber to fiber, a fiber optic connector must maintain the precise alignment of the individual optical fibers in a predetermined manner such that the optical fibers will remain aligned as the fiber optic connector is mated with another fiber optic connector or with other types of optical device. Therefore, a variety of methods have been developed to align individual optical fibers prior to sealing the optical fibers within the fiber optic connector.

For instance, U.S. Pat. No. 5,606,635 teaches an improved fiber optic connector and associated fabrication method which includes a substrate and at least one microactuator mounted on the substrate and adapted for relative movement therewith such that an optical fiber which is mounted to the microactuator can be precisely aligned. By precisely positioning the optical fibers, such as with respective lens elements (viz., graded index lens elements), the fiber optic connector of the '635 patent efficiently couples the aligned optical fibers, such as single mode optical fibers, with other optical devices, including other optical fibers. Additionally, the microactuator used in the fiber optic connector described in the '635 patent is controllably positioned relative to the substrate so as to precisely align the optical fiber mounted thereto after the connector housing has been hermetically sealed so as to further enhance the precision with which the optical fibers can be aligned. The positioning means described in the '635 patent for the microactuators is a bimorphic actuator formed of two different materials that respond differently to electrical stimuli such that a deflection created in the bimorphic actuator by electrical stimuli can be used to controllably position a carrier body to which an optical fiber is fixed. Two or three bimorphic actuators are described as usable in the '635 patent such that the carrier holding the optical fiber can be controllably positioned in first, second or third orthogonal directions.

While the fiber optic connector of U.S. Pat. No. 5,606,635 provides a significant improvement over previous active fiber micro-aligner actuator technologies, further improvements are nonetheless desired in the fiber optic connector field. For example, fiber optic circuits and sensors that are embedded in composite structures, such as fiber-reinforced plastics (e.g., a cured prepreg of carbon fiber reinforced epoxy) are desirable over other types of sensors, e.g., surface attached-optical fibers or metallic wires or strain gages, for a number of reasons. Namely, embedded fiber optic circuits and sensors have many benefits over alternative types of sensors, such as well-tolerating the composite manufacturing process; they do not degrade the composite strength; they are EMI and EMP insensitive; they are non-magnetic and are transparent to radar; they provide increased sensitivity as compared to conventional strain gauges; the embedded optical sensors are multiplexable and, therefore, require fewer egress points; and they are relatively lightweight.

In implementation, however, the embedded fiber-to-embedded fiber coupling first requires the fiber to be egressed from the composite structure and, secondly, it requires special protection from being sheared off during the manufacturing process. Clean trimmed fiber optics eliminate this vulnerability but must allow for micron tolerances, which are too small. Previously, hand alignment of each individual fiber at the component's edge egress has been used. However, such a manual approach makes it infeasible to correct for tolerance errors in a fielded system.

As can be appreciated, inadequate fiber optic coupling has been a barrier preventing single mode and multimode fiber optic sensors systems from being incorporated into composite structures, i.e., structures having embedded fiber optics. This dilemma is driving the use of alternative sensor technologies and less desirable surface attachment processes. For instance, surface attached optical fibers are vulnerable to damage and cannot measure important strains and temperatures unlike the embedded case.

Therefore, prior to the present invention, a need has existed for an optical connector which is capable of providing optical coupling between two structurally spliced machined composite components in which there are edge egressed embedded single mode fiber optics.

SUMMARY OF THE INVENTION

The invention meets the above needs and overcomes the deficiencies of the prior art by providing an improved fiber optic connector providing precise optical transmission between optical fibers and associated fabrication methods.

The inventive fiber optic connector has a micro-alignable lens with autofocus capability located within a connector housing as employed to couple separate optical fibers. In one embodiment, the inventive fiber optic connector has a connector housing including two opposite sidewalls and a base side, and the housing sidewalls define apertures through which optical signals can be transmitted into the housing from an input optical fiber and out of the housing to an output optical fiber, respectively, where the optical fibers are located in fixed positions outside the housing, and the housing contains a unitary optical lens element located between the housing apertures, wherein the optical lens is comprised of two segments optically bonded along confronting respective lens segment surfaces at an oblique angle effective to transmit light from the input fiber to the output fiber and re-direct light reflected back from the output fiber to a photodetector integrally attached to the exterior of the lens element. Further, the optical lens element is micro-positionable in three orthogonal directions relative to the associated input and output optical fibers, such that the intervening lens element can micro-align the optical signals transmitted between the respective input and output optical fibers without the need to physically contact the optical fibers.

By optically precisely aligning the lens with the optical fibers without requiring direct physical contact and proximity, the fiber optic connector of the present invention can efficiently couple the optical signals carried by the input and output optical fibers, such as single mode optical fibers or multimode fiber optic sensors systems, between separate composite structures, i.e., structures having embedded fiber optics. In addition, the micro-aligner also can be controllably positioned so as to permit precise alignments of the lens element after the connector housing containing the lens has been hermetically sealed so as to further enhance the precision with which the optical fibers can be aligned and permit in-the-field implementation. Thus, the micro-aligner can be used to precisely align the lens element such that the optical signals transmitted therethrough can be collimated.

One suitable type of micro-aligner that can be used to precisely position the lens elements in the practice of this invention, includes a lens holding means for receiving the lens, in which the held lens is independently movable in any of three orthogonal directions relative to the input or output optical fiber. One exemplary micro-aligner useful for accomplishing this function has a carrier upon which the optical lens is held, and the carrier is provided with first and second in-plane (viz., x-axis and y-axis) microactuators for inducing in-plane movement of the carrier and held lens in respective first and second orthogonal directions along the surface plane of the carrier, and a third microactuator for inducing out-of-plane (viz., z-axis) movement of the carrier and held lens in a third direction that is orthogonal to said first and second orthogonal directions. The carrier is positioned within a recess of a stationary alignment housing as defined by a base and upright sidewalls. The carrier includes first and second biasing means biased against sidewalls of the stationary alignment housing to thereby impose counter forces against which the respective first and second in-plane microactuators on the carrier must act and overcome (as well as the stiction/friction associated with moving the carrier across the surface of the base, the forces associated with the wire bonds and all other forces typically encountered in aligning and bonding optical fibers) to induce in-plane movement of the carrier relative to the optical device. Backstops are provided on the carrier to limit the return movement of the in-plane microactuators. When the first and second (in-plane) microactuators are at rest, the counterforce biasing means establish an equilibrium in-plane reference position of the unitary movable carrier in a corner of alignment housing. This three-axes active lens micro-aligner enables the precise alignment of the optical signals being transmitted between the optical fibers.

In one advantageous embodiment, the inventive fiber optic connector is used for optical coupling of optical fibers in two spliced composite parts. For instance, the inventive connector can be used to couple an array of embedded edge trimmed single mode fiber optics in the primary structure to an array of single mode fiber optics in an attached substructure. More specifically, the inventive fiber optic connector is capable of providing optical coupling between two structurally spliced machined composite components in which there are edge egressed embedded single mode fiber optics. The inventive fiber optic connector permits rapid mating of component edges, allowing the rapid misalignment to be eliminated by the micro-aligners located inside the connector housing. The inventive fiber optic connector enables affordable optical connection with sub-micron alignment tolerances to be made after the embedded fiber optics are machined off at the egress point during a standard composite trimming process.

This invention makes also it possible to fabricate modular, composite structures that have integrated microelectronics devices and circuitry. The modularity permits the fabrication of a common primary structure and then using the quick release connectors and interchangeable devices tailor the structure to meet any unique mission objectives.

Also, this invention permits the use of embedded fiber optic sensors and signal conduits in fieldable systems. The fiber optic connector of the present invention makes correction for tolerance errors possible for a fielded system.

The present invention will now be described more fully hereinafter with reference to the accompanying drawings, in which a preferred embodiment of the invention is shown. Like numbers refer to like elements throughout.

BRIEF DESCRIPTION OF THE DRAWINGS

Corresponding reference characters indicate corresponding parts throughout the drawings. The drawings should not be construed as necessarily being drawn to scale.

DETAILED DESCRIPTION OF THE PREFERRED EMBODIMENTS

Figure 1:
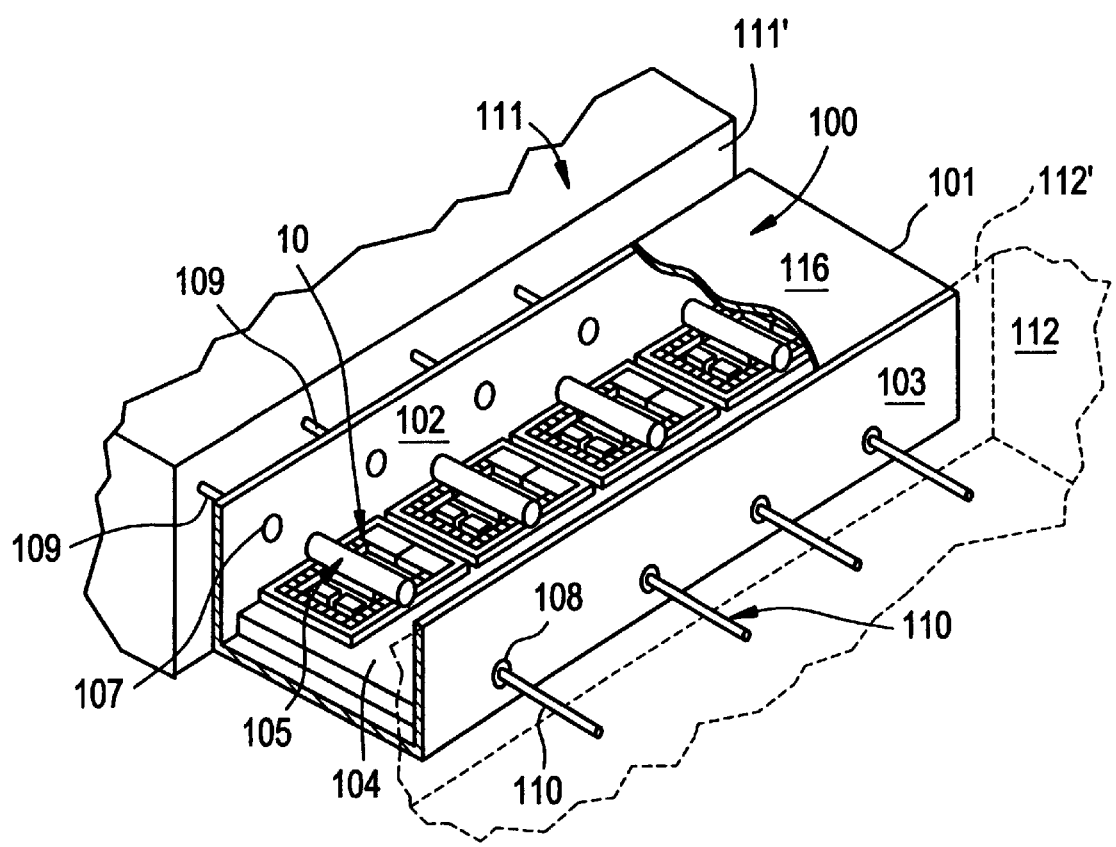
FIG. 1 is a perspective view of the fiber optic connector of the present invention, and as partially cut-away for the sake of clarity, being used to optically couple optical fibers at the edges of two composite structural parts.

Referring now to the figures, and particularly to FIG. 1, a fiber optic connector 100 has an exterior structure formed as a housing 101 including a base side 104 and opposite sidewalls 102 and 103 upstanding from the base side 104. While the connector housing 101 can be comprised of a variety of materials, the connector housing of one embodiment is comprised of metal, such as stainless steel, and, in a more specific embodiment, is comprised of KOVAR™ brand stainless steel. Preferably, the housing 101 is comprised of a material which has a coefficient of thermal expansion which closely matches the coefficient of thermal expansion of the windows 107 and 108.

Fiber optics have been pre-embedded in composite structures 111 and 112 bordering the fiber optic connector 100 for which optical coupling will be effected. The sidewalls 102 and 103 of the connector housing 101 also define apertures into which hermetically sealed windows 107 and 108, respectively, are pre-installed, which permit optical signal transmission between the exposed input optical fiber 109 extending from the edge surface 111' of first composite structure 111 into the interior of the housing 101 and from the interior of the housing 101 back out to exposed output fiber 110 extending into edge surface 112' of second composite structure 112. As appreciated, FIG. 1 only shows edge portions of the composite structures 111 and 112 as the rest of the structures thereof do not interact directly with the fiber optic connector 100 of interest.

The connector 100 is adhesively attached to the composite structures 111 and 112 prior to executing alignment of the lens 105. The input optical fiber 109 and an output optical fiber 110 have exposed terminal ends 109' and 110' (see FIG. 2), respectively, that are brought into close proximity with the respective windows 107 and 108, and then they are fixed in position in relation to the windows of housing 101, such as by using a conventional transparent epoxy used for opto-electronic packaging or the same type of resin that is used in the composite structure. The optical fibers 109 and 110 are each aligned with and attached to a respective aperture/window 107 or 108 defined in the adjoining sidewall of the connector housing 101. While FIG. 1 illustrates four input optical fibers 109 to be concurrently aligned with four output optical fibers 110 via the fiber optic connector 100, it will be appreciated that the invention is applicable to the coupling of a single pair of fibers or any plural number of fiber pairs within practical reason.

The refractive lens element 105 is disposed within the housing 101 in a generally co-axial orientation with windows 107, 108 and fibers 109 and 110. The lens 105 couples optical signals transmitted from optical fiber(s) 109. The lens element 105 is held by micro-aligner 10 within the housing 101. The micro-aligner is positioned within the connector housing 101 such that the lens 105, as initially cradled on the micro-aligner 10, is generally aligned up about a common longitudinal axis passing through windows 107 and 108, and only micro-alignments are needed to be induced by the micro-aligner 10 to achieve maximum optical coupling. The lens 105 is positionable in three orthogonal directions relative to either one or both of the input and output optical fibers 109 and 110 by operation of the micro-aligner 10, which is described in greater detail below. That is, the fiber optic connector 100 of the present invention includes a base side or substrate 104, such as a metallic, or a ceramic or a silicon substrate, and at least one micro-aligner 10 is mounted on the base side 104 for each lens element 105, respectively, and adapted for relative movement therewith. The lens element 105 is preferably affixed to the micro-aligner 10 such that relative movement of the micro-aligner 10 will, in turn, controllably position the respective lens element 105 with respect to a window (107, 108) defined in the sidewall (102, 103) of the connector housing 101, and, with respect to an optical fiber (109, 110) fixed in position on the exterior side of the housing window (107, 108). In this way, the fiber optic connector 100 of this invention provides independent alignment capability to lens 105, enabling correction of tolerance errors at both the input fiber 109 and output fiber 110. In one preferred embodiment, the lens elements disposed within the connector housing are first and second graded refractive index lenses, such as graded index (GRIN) lens elements.

The lens 105 can be aligned with the optical fibers 109 and 110 either prior to or following the hermetic sealing of the connector housing 101. The hermetic sealing of the housing 101 can be accomplished by affixing a cover plate thereto by conventional methods. In embodiments in which the optical lens 105 is aligned prior to sealing the connector housing 101, such as during manufacturing, the lens 105 can be aligned with respect to the respective optical fibers 109, 110, and, thereafter, the connector housing 101 can be sealed. For example, a lid 116 can be secured, such as by seam sealing, to the connector housing 101 following alignment of the lens 105. In addition, the position of the lens 105, as supported upon micro-aligner 10, respectively, can be fixed prior to sealing the connector housing 101, such as by activating a radiation-curable adhesive, such as an ultraviolet light-curable adhesive, mutually in contact with both an alignment frame (feature 17 in FIG. 4A, and described in detail below) of a micro-aligner 10 and the underlying fiber optic connector base side 104. The connector housing 101 can include a transparent window through which a laser or other appropriate light source can be directed so as to activate the adhesive or solder and bond the alignment frame of the micro-aligner 10 (or 10') to the base side 104. Alternatively, the hermetically sealed connector housing 101 can include an additional lead which is electrically connected to the base side 104 in the vicinity of the heat-activatable adhesive such that the adhesive can be resistively heated and the alignment frame of the micro-aligner 10 can be thereby be bonded to the base side 104.

Alternatively, in embodiments in which the lens 105 is aligned after hermetically sealing the connector housing 101, the fiber optic connector 100 can also include a plurality of electrical pins (not shown) extending through the rear surface of the connector housing 101 to provide electrical access to each of the microactuators (i.e., features 15, 16 and 19 of FIG. 4A, discussed in greater detail below) of the micro-aligner 10. In particular, electrical leads can interconnect the pins with respective ones of the x-, y-, and z-axis microactuators, and, more particularly, with bonding pads disposed on the opposed end portions of each microactuator. Accordingly, by applying appropriate electrical stimuli to predetermined ones of the electrical pins, each optical lens 105 can be individually positioned in first, second, and third orthogonal directions relative to the respective optical fiber 109 or 110 after the connector housing 101 has been hermetically sealed.

By transmitting predetermined optical signals through the optical fiber 109 and by detecting the resulting optical signals reflected back to photodetector 114 associated with lens element 105 from output fiber 110, the relative alignment of the optical fibers with the lens element 105 can be determined.

Figure 2:
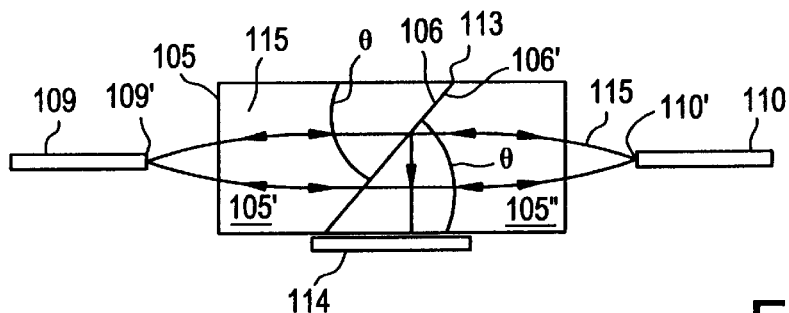
FIG. 2 is a schematic representation of the optical relationship of the optical fibers being coupled and the GRIN lens component of the fiber optic connector shown in FIG. 1.

FIG. 2 schematically illustrates the optical circuit provided with the inventive optic connector having the above-described single actuated lens element with autofocus provided using an integrated photodetector (e.g., an integrated photodiode) and retrofocus feedback. Light 115 emitted from the input fiber 109 passes through the unitary, composite GRIN lens 105, and the light 115 is refocused onto the output fiber 110. This automatic alignment system concept uses a single GRIN lens 105 comprising two GRIN lens segments 105 and 105' which are otherwise cylindrical-shaped lenses except for one oblique-inclined surface 106 or 106' extending at an absolute angle θ of about 45 degrees. The inclined surfaces 106 and 106' of the two lens segments 105' and 105", respectively, have the same angle of inclination θ such that lens segments 105' and 105" can be optically bonded by conventional lens bonding or cementing techniques at their respective surfaces 106 and 106' in a complementary manner such that the exterior surface of the resulting unitary lens 105 is smooth without bumps or abrupt interruptions at the outer perimeter of the interface 113 where the surfaces 106 and 106' meet. Tolerance error in the placement of the fibers 109 and 110 requires adjustment in the position of the cemented GRIN lens 105 in three orthogonal axes using micro-aligner 10 to bring the output fiber 110 to a well coupled condition with respect to the input fiber 109. The micro-aligner can be any 3-axis micro-aligner used or useful for aligning optical fibers in three orthogonal directions within submicron tolerances, such as the micro-aligner device described in U.S. Pat. No. 5,602,955, which teachings are incorporated herein by reference.

Figure 3:
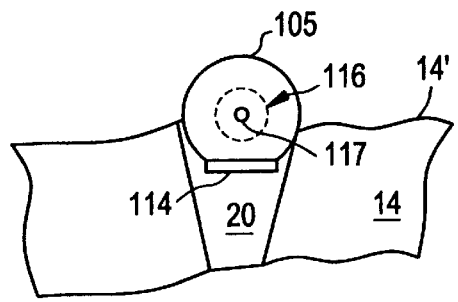
FIG. 3 is an end view of the schematic representation of the fiber optic connector shown in FIG. 2.

As shown in FIG. 3, the lens 105 collimates light 115 received from the input fiber (feature 109 in FIG. 2) and re-images the collimated light having a beam footprint 116 onto the smooth polished tip 110' of the output fiber. Since not all the light passes into the core 117 of the output fiber 105, some light is reflected back into lens 105 where it is redirected by the lens interface 113 into the photodetector 114. Lens 105 rests in holding groove 20 formed in the surface 14' of the "floating" carrier substrate 14 of micro-aligner, which features are taken up in greater detail below in connection with detailed discussions herein of FIGS. 4A–B. The electrical output of the photodetector 114 is optically coupled, e.g., by using a conventional fiber optic patch cord (not shown), to a conventional optical power meter (not shown). The optical power meter is a device that will produce an (analog or digital) output representative of the feedback reflected light received from the output fiber 110 as reflected off of lens interface 113. The output of the optical power meter is supplied to a computer in digital form, preferably via a digital data bus. This provides a mechanism for measuring the precision of the alignment being provided between lens 105 and the input and output fibers 109 and 110 as a function of the micro-alignments being induced by respective micro-aligner 10.

Figure 7A:
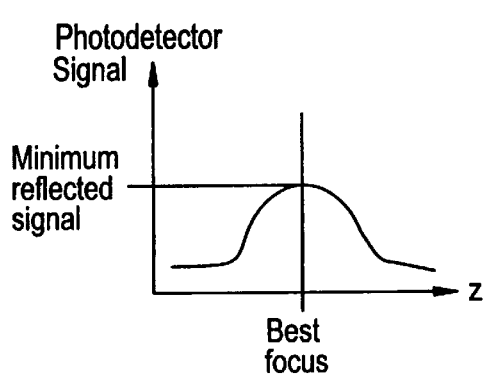
FIG. 7A is a graphical representation showing the relationship between the photodetector signal for fiber coupling using a fiber optic connector according to FIG. 1 relative to z-axis translation of the lens using the micro-aligner of FIG. 4A.
Figure 7B:
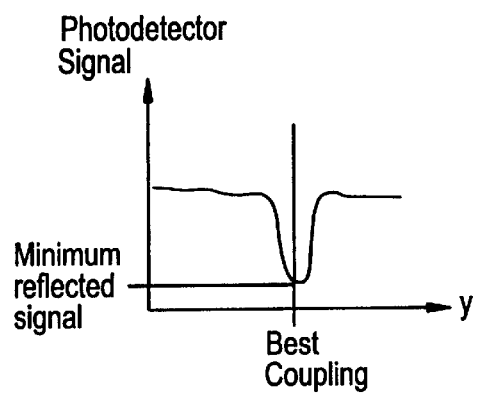
FIG. 7B is a graphical representation showing the relationship between the photodetector signal for fiber coupling using a fiber optic connector according to FIG. 1 relative to y-(or x)-axis translation of the lens using the micro-aligner of FIG. 4A.

In FIG. 7A, a graphic representation of the retrofocus feature of the inventive fiber optic connector is provided for sake of illustration. The retrofocus feature permits complete alignment in the x, y and z axes. As indicated above, some the light incident on the output fiber 110 is reflected back into the lens 105 because, as a practical matter, not all the light emanated from lens 105 can be transmitted into the fiber core 117 of fiber 110. As shown by the directional arrows in FIG. 2, the light 115 reflected back from the tip 110' of optical fiber 110 is directed into an integrated photodetector 114, as shown by the directional arrows, by way of the slightly reflective, viz. a few percent (e.g., 0.1–3%) reflective, optically bonded surfaces 106 and 106' within lens 105. The lens surfaces 106 and 106' are preconditioned by conventional techniques to be made slightly optically reflective. As such, interface 113 of composite lens 105 serves as an optical splitter of sorts. Translation of the lens 105 along the z-axis adjusts the focus of the output fiber 110. When the condition of best focus is achieved, the retro-reflection path from the end of the fiber is retraced perfectly onto itself, providing the largest possible signal at the photodetector as shown in FIG. 2. Once the best focus has been set in the z-axis direction in the manner described above, the lens must be scanned in the x-y plane to properly couple to the input fiber 109. In this case, scanning across the fiber's face causes the reflected signal to go to a minimum when the fiber is well coupled, i.e., maximum transmission through the fiber means minimum reflection back to the photodetector 114. FIG. 7B shows a representative scan for the y-axis, assuming the x-axis is perfectly aligned.

Once alignment is achieved between lens 105 and output fiber 110 in the above manner, the relative position of the lens element 105 can be fixed by bonding the alignment frames (feature 17 in FIG. 4A) of micro-aligner 10 to the base side 104 of the housing 101, such as by employing an adhesive mutually in contact with both the alignment frame and the base side in the manner described above.

Composite structures 111 and 112 in FIG. 1 can be a standard organic carbon composite structure fabricated with standard techniques, e.g., lay-up or fiber placement. Embedding an optical electrical flexcircuit simultaneously embeds the fiber optic (109, 110) and electrical conduit in the structure during the manufacturing process. The connector region shown in FIG. 1 is machined off and optically polished using standard polishing techniques suitable for optical surfaces. The fiber optic connector 100 is attached to the primary structure 111 making electrical connection to the power bus (not shown) and completing the electrical circuit for the remaining structure 112. The secondary structure 112 is keyed and attached to the primary structure 111. The fiber optic connector 100 is subsequently powered and the optical circuit is completed.

Figure 4A:
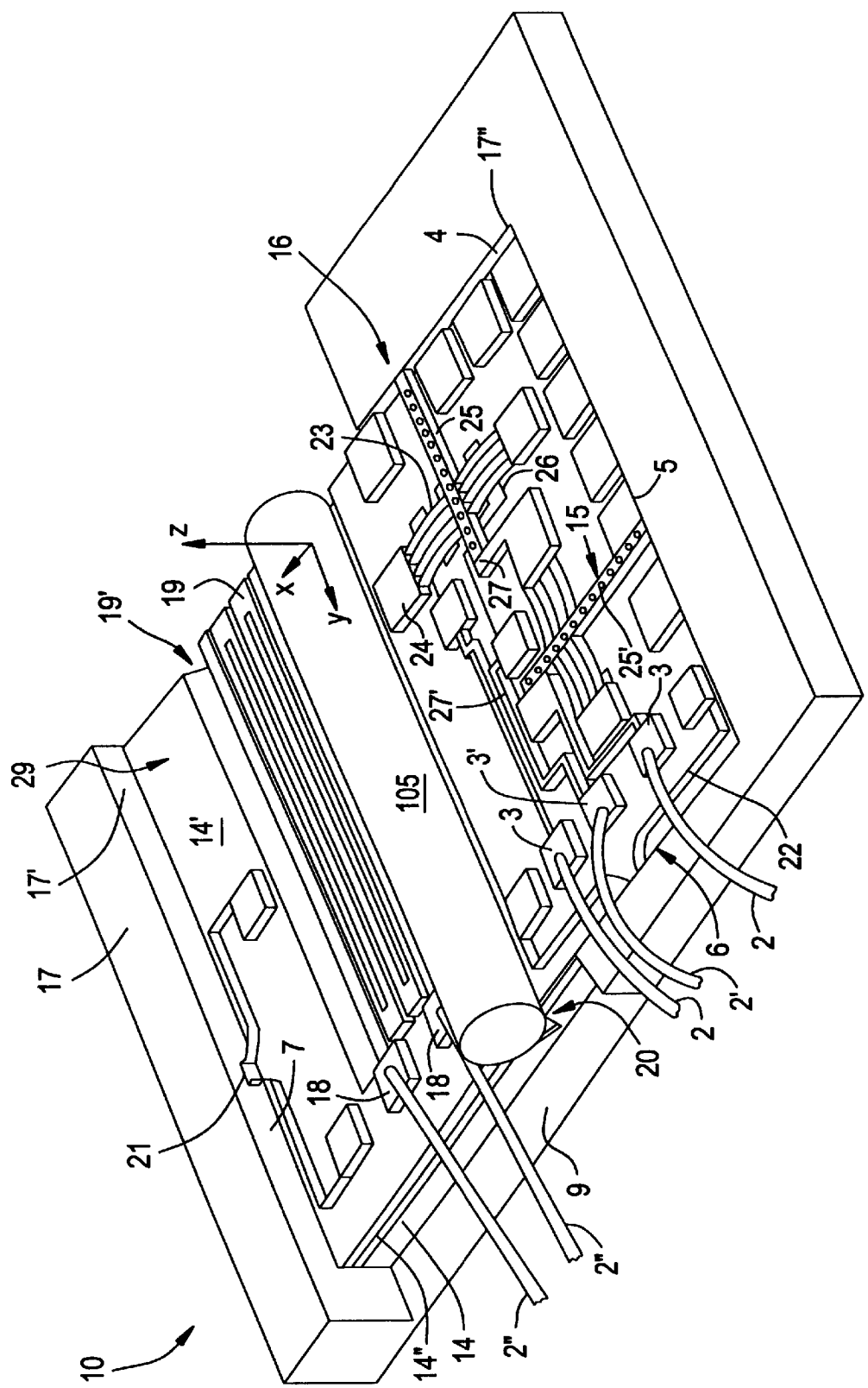
FIG. 4A is an enlarged perspective view of a micro-aligner used inside the connector housing in accordance with one embodiment of the invention.

Referring to FIG. 4A, a preferred micro-aligner device 10 for use in this invention for providing independently controllable micro-positioning of a lens element 105 is shown in more detail. The micro-aligner 10 controllably positions lens element 105 held and supported therein to precisely align it with an output fiber 110 located fixed in position outside window 108 of the connector housing 101 as described above (see FIG. 1). The optical fibers 109 and 110 (FIG. 1) may be a single mode, multi-mode or polarization preserving optical fiber. In addition, the optical fibers may have a lensed facet or a cleaved end facet without deviating from the scope of the invention.

The micro-aligner 10 must include a lens holding and supporting means for receiving the lens, and the micro-aligner must be able to manipulate the held lens independently in any of three orthogonal directions (i.e., x-, y-, and z-axis directions) relative to the associated optical fiber (located outside the connector housing) within precise submicron tolerances, preferably within about 1.0 μm or less. The micro-aligner 10 must be small enough to easily fit within the housing enclosure 101, which housing can involve sizes of approximately 5×4×1 mm³, while still being large enough to controllably support a lens and be robust and durable to tolerate in-the-field utilizations and handling and the like.

As shown in FIG. 4A, micro-aligner 10 has a carrier substrate 14 upon which its various components are fabricated. The lens 105 is precisely attached in an optical groove 20 formed in carrier 14. The carrier substrate is a unitary body, and it rests on a base 9 of an alignment housing 17.

The alignment housing 17 of the micro-aligner 10 is a frame-like body disposed in fixed relation to optical device 13. The lens 105 can have a major length that is entirely supported by the groove 20, or alternatively, a major portion of the length of the lens 105 can be supported by groove 20 with ends of the lens 105 hanging over the side edges of the frame 17 (room permitting inside the housing 101). For example, the alignment housing 17 includes sidewalls 17' upstanding from base 9 along four sides and can include openings sidewalls on two opposing sides of the alignment housing 17 to accommodate positioning of a lens 105 in groove 20 where the lens has some portion of its longitudinal length extending off the carrier 14, if desired. The size of the recess formed by the sidewalls 17' is selected to slightly exceed the dimensions of the carrier 14 while being close enough to permit spring biasing to be created between the sidewalls of the alignment support structure and the carrier, as will be described in greater detail below. In a preferred embodiment, the alignment housing will include four upright sidewalls 4, 5, 6, and 7 arranged on base 9 such that a pair of parallel sidewalls is provided normal to each of the x-direction (i.e., walls 5, 7) and the y-direction (i.e., walls 4, 6) that together with base 9 define a recess 29 therein that will receive carrier 14 for reasons that will become apparent from the following descriptions.

The alignment housing 17 is preferably formed of a thermally conductive material to serve as a heat sink. In addition, the alignment support structure can also draw heat from the underside of the carrier 14. By drawing heat from the carrier, the lens 105 can be maintained at a predetermined constant temperature such that the alignment of the lens 105 is not altered or otherwise affected due to temperature fluctuations. In one exemplary embodiment, the alignment support structure is comprised of a metallic material, such as copper or nickel. The alignment support structure can be a micromachined cavity or box formed by a variety of processes, such as by LIGA processing methods for making alignment structures, such as those described in U.S. Pat. No. 5,602,955, which teachings are incorporated herein by reference. In this way, the alignment housing 17 has the sidewalls 17' and base 9 formed as an integral body.

The carrier 14 sits on the base 9 of the alignment housing structure 17 by virtue of gravity and springs 21 and 22 which act to hold it in housing recess 29, and it is not bonded or otherwise attached thereto. Thus, carrier 14 is freely slidable over base 9 once any inter-frictional forces therebetween are overcome. In one preferred embodiment, substrate 14 comprises a layer of polished silicon. Other semiconductor materials that can be micromachined are also usable for substrate 14. The side length dimensions and thickness of carrier 14 can be relatively small, for example, the side dimensions each can be less than or equal to 5 mm and thickness can be approximately 0.5 mm.

It is to be understood that groove 20 can be formed by a variety of processes, such as etching, and may have a variety of other cross-sectional shapes without deviating from the scope of the invention. For instance, channel 20 can be a groove having a v-shaped cross section with opposing side walls defining an angle of approximately 55° with respect to the top surface 14' of substrate 14, such as a cylindrical optical body-holding groove of the type described in U.S. Pat. No. 5,602,955, which teachings are incorporated herein by reference. For a bulk silicon wafer carrier, this type of groove can be formed by an anisotropic wet etch of the wafer surface with potassium hydroxide, or anisotropic plasma etch, and the like, according to techniques well known in the semiconductor processing arts, such as by anisotropic etching in the carrier substrate 14 in two different directions or orientations, such as <110> and <100>. A groove also can be formed by laser cutting of the wafer surface. Preferably, the V-shaped groove preferably should be made deep and wide enough so that lens 105 is initially positioned (cradled) in the groove slightly below (e.g., approximately 5 μm below) its final predicted aligned position.

Alternatively, in lieu of groove 20, an LIGA channel can be defined in its body for receiving and holding the lens 105 in a fixed relation thereto. An optical bonding agent or solder, for example, could be used to secure lens 105 within an LIGA channel to maintain it in a fixed position relative to carrier 14. For example, a conventional optical glass bonding agent, such as Gould GlasSolder™ bonding agent, or a high temperature fluxless solder, such as gold/tin eutectic alloy solder, can be used to bond lens 105 to carrier substrate 14. As known to those skilled in the art, the surface of lens 105 is preferably metallized with titanium, platinum and gold, for example, which improves the bond within an LIGA channel. Whether holding means 20 is a groove or LIGA channel, carrier substrate 14 constitutes a carrier for holding lens 105 in a fixed relation thereto.

The aforesaid active micro-aligner 10 includes first and second in-plane actuators 15 and 16 for effecting the in-plane alignment in the orthogonal in-plane (x-and y-axes) directions of the lens 105 held by the micro-aligner 10, while a third actuator 19 is used for effecting the out-of-plane (z-axis) alignment of the lens 105 held by the micro-aligner 10. The preferred constructions of the in-plane and out-of-plane microactuators are described in greater detail below.

Referring to FIG. 4A, in order to induce in-plane alignment of lens 105 as held on carrier 14 with an associated optical fiber located outside the connector housing 101, the micro-aligner includes two orthogonally positioned in-plane actuators, including x-direction actuator 15 and y-direction actuator 16, respectively, which are adapted to move carrier 14 relative to stationary alignment housing 17 and the associated optical fiber in respective planar orthogonal x- and y-directions respectively, extending in a plane defined by the surface 14' of substrate 14. In turn, this permits lens 105 to be precisely aligned with an associated optical fiber in the in-plane directions.

In one embodiment, x-direction actuator 15 and y-direction actuator 16 are thermally actuated arch beam actuators. More specifically, and still referring to FIG. 4A, when such a thermally actuated arch beam actuator 16 is activated, its beam 25 moves relative to the stationary alignment housing 17 and its sidewalls 17' and base 9. Beam 25 moves along an orthogonal in-plane direction 16" (see FIG. 5), which is opposite to the y-direction indicated in FIG. 4A, until beam 25 comes into contact which the immediately confronting stationary sidewall 4 among sidewalls 17' of alignment housing 17 and creates an opposing force pushing the carrier 14 away from the sidewall 4 in the y-direction. The other in-plane thermally actuated arch beam microactuator 15 interacts in a similar manner via its beam 25' with another sidewall 5 among sidewalls 17' of the alignment housing 17 to push carrier 14 in an x-direction that is orthogonal to the y-direction.

The counterforce return springs 21 and 22 provide counter biasing forces that the x-direction actuator 15 and y-direction actuator 16 must act against and ultimately overcome, respectively, when activated to impart in-plane movement to carrier 14. Counter force spring 22 is shown in more detail in FIG. 4B, which cuts away a portion of the alignment housing sidewalls 17' for sake of illustration only. The counterforce springs 21 and 22 are biased against respective stationary walls 6 and 7 of alignment housing 17 to create respective biasing forces pushing the carrier 14 back into reference corner 17" of alignment housing 17 when the in-plane actuators 15 and 16 are both de-activated, and the carrier 14 is held in place as wedged into corner 17" as the equilibrium condition of the micro-aligner 10 until either or both of the in-plane actuators 15 and/or 16 are again activated. More specifically, when either or both are actuated, arch beam actuators 15 and 16 overcome the counter bias force provided by springs 21 and 22, respectively, as well as the frictional forces between carrier 14 and the alignment housing base 9, and the bending moments of the leads 2 connected to pads 3, to move carrier 14 in the desired in-plane direction.

Figure 5:
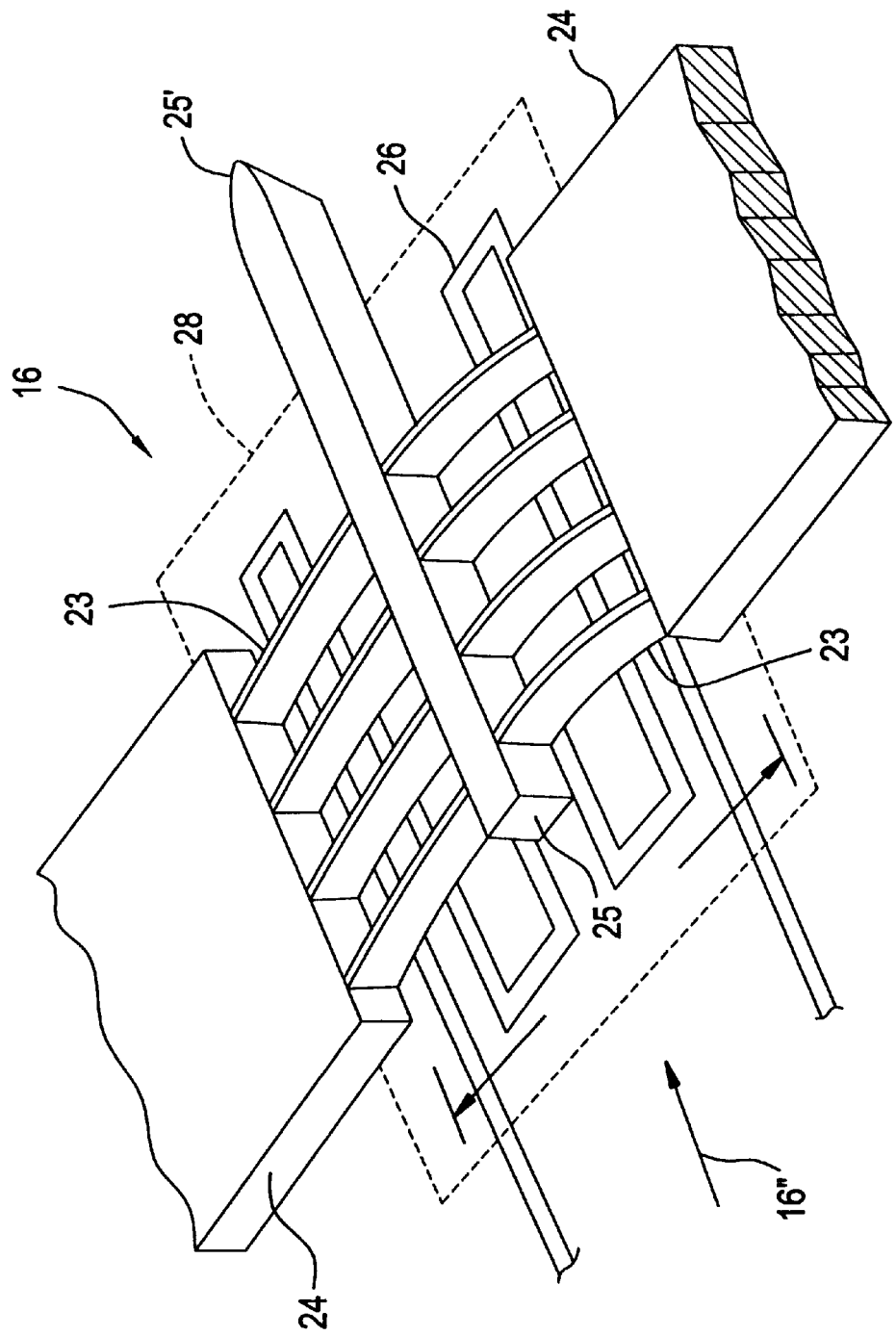
FIG. 5 is a perspective view of a thermal arch beam actuator used as the in-plane (x-axis) actuator in the micro-aligner shown in FIG. 4A.

As illustrated in more detail in FIG. 5 with respect to the y-direction thermally actuated arch beam actuator 16, and as equally applicable to x-direction thermally actuated arch beam actuator 15, the thermally actuated arch beam actuator 16 generally includes a plurality of arches 23 supported between a pair of side support structures or pads 24 and suspended over diaphragm 28 formed in the underlying surface 14' of substrate 14 by undercut etching of the substrate 14. Advantageously, such actuators 16 (and 15) are comprised of a single material so that they are less expensive and less complicated to fabricate than, for example, bimorphic actuators made from two materials. Although FIG. 5 illustrates actuator 16 as having four arches 23, the number of arches 23 may vary (e.g., 2–20). A cantilever beam 25 extends across the arches 23. The cantilever beam 25 has a rounded distal end 25*a* oriented towards the alignment housing sidewall 4 (or 5).

Figure 4B:
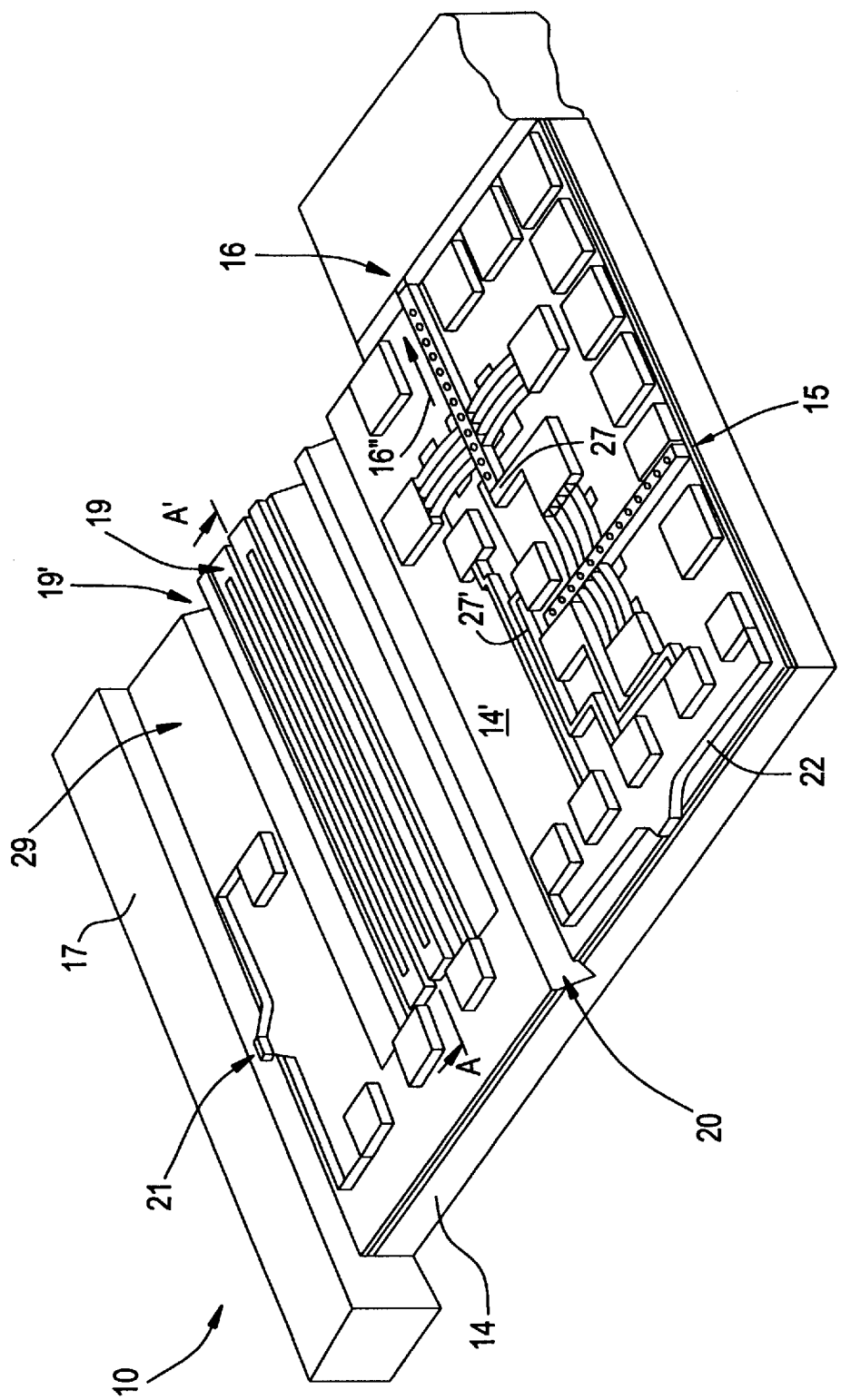
FIG. 4B is another enlarged perspective view of the micro-aligner according to FIG. 4A showing including a cut-away view of a portion of the alignment housing structure thereof and without the lens element illustrated for the sake of clarity.

When heated by a heater 26, thermal expansion causes the arches 23 to bend in a direction determined by their orientation, namely, in the direction 16" indicated in FIG. 5 (and FIG. 4B). As a result of the bending of arches 23, beam 25 moves along direction 16" towards and ultimately against sidewall 4 of the alignment housing 17 (see FIG. 4A). In a preferred embodiment, a polysilicon resistive heater positioned, or located, in close proximity to each actuator 15 or 16 (i.e., directly below the arches 23) embodies the heater 26. Thus, heater 26 provides heat to arches 23 when electrically stimulated for urging beam 25 towards and ultimately against bearing surface 4.

As a result, each beam 25, 25' of the respective thermally actuated arch beam actuators 16, 15, respectively, can be electronically controlled to independently apply a positive force to the carrier 14 effective to overcome the opposite biasing force of the associated retainer springs 21, 22, respectively, causing the carrier 14 to move in the opposite direction to the direction of force being applied by either beam 25, 25' against a sidewalls 4, 5 of the alignment housing 17. This permits for controlled positioning of the carrier 14 relative to the optical device 13 (and the alignment housing base 9) in an in-plane direction. The top surface of base 9 and the bottom surface of carrier 14 are preferably polished which reduces friction between the two features. Alternatively, the bottom surface of movable carrier 14 is coated with TEFLON® in order to reduce frictional forces between the top surface of a base 9 and the bottom surface of carrier 14.

In general, the direction of arches 23 determines the direction in which actuator 16 (or 15) bends, or deflects, and the amount of this movement is a function of the current supplied to polysilicon resistive heater 26. Thus, controlling the current supplied to heater 26 controls the deflection of actuator 16 and, consequently, controls the position of carrier 14. Accordingly, in-plane microactuators 15 and 16 controllably position carrier 14 relative to the output optical fiber to precisely align the lens 105 in groove 20 (or as bonded to an LIGA channel 20) with the optical fiber 110 in the respective x- and y-directions.

As also illustrated in FIG. 4A, micro-aligner 10 has connections or leads 2 to a current supply (not shown) which supplies current to the polysilicon heaters 26 to resistively heat the respective arch beam actuators 15, 16. Return lead 2' is connected to bonding bad 3'. In order to facilitate this electrical stimulation of heaters 26, bonding pads 3 and 3', preferably thin films of a conductive material (e.g., gold), are formed on opposite end portions of the resistive element of each heater 26 for connection to the leads 2 from a current supply. Preferably, the heaters 26 can comprise a resistive element having a serpentine-pattern beneath the arches 23 of each in-plane microactuator 16 (and 15), which heats when energized with current. A cavity is provided by etching the underside of carrier 14 below a portion of each in-plane actuator 15 and 16 to form diaphragm 28 (see FIG. 5) to help thermally isolate heaters 26 from the rest of micro-aligner 10.

As shown in FIG. 4A, for example, backstops 27 and 27' are located on carrier 14 behind both the opposite distal ends (25*a*, 25*b*; FIG. 5) of beam 25 and beam 25', respectively, to delimit the amount of return movement of respective beams after distension prevent the arches from buckling when the beam returns.

In another embodiment of this invention, the x-direction actuator 15 and y-direction actuator 16 can be bimorphic actuators, such as the type described in U.S. Pat. No. 5,602,955, which teachings are incorporated herein by reference.

To induce out-of-plane positioning alignment of the lens 105 with the output optical fiber 110 in a third direction, i.e., the z-axis direction indicated in FIG. 4A, that is orthogonal to the aforesaid two in-plane (x,y) directions, a third microactuator 19 is provided on the carrier 14 which, when activated, effectively deflects the carrier 14 upward in a normal direction away from the direction of the alignment housing base 9. This three-axes active micro-aligner 10 enables the precise alignment of a lens with the output optical fiber located off the carrier and outside the connector housing without needing physical contact of the optical fibers to be coupled.

Preferably, the z-direction actuator 19 is a bimorphic-type actuator formed on the carrier 14. Advantageously, the bimorphic actuator 19 is adapted to controllably position carrier 14 in the z-direction relative to the base 9 of the alignment housing 17 and the respective input or output optical fiber. In general, layers of two materials which respond differently to thermal stimulation embody bimorphic actuator 19. In general, a resistive heater is sandwiched between the two layers to controllably introduce the thermal stimulation.

Figure 6A:
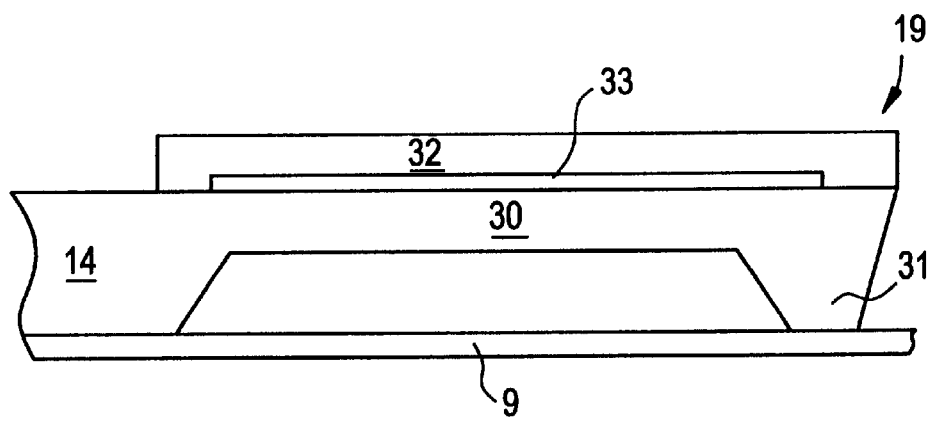
FIG. 6A is a cross section of the z-axis bimorphic micro-actuator used in the micro-aligner subsystem shown in FIG. 4A taken along line A–A' of FIG. 4B when the z-axis actuator is at rest.

For example, FIG. 6A shows the z-axis actuator 19 when at rest. The z-axis actuator 19 includes a diaphragm structure 30 having a distal end 31 and the diaphragm structure is formed by undercut etching a portion of the silicon substrate 14, as defined between two parallel relief channels 19' (see FIG. 4A) formed through carrier substrate 14. Distal end 31 of z-axis actuator 19 is adjacent yet spaced from sidewall 4 of alignment housing 17. The processing used to form cantilever-like structures in the surface of a silicon substrate by anisotropic wet etching is known to those skilled in the art. The bimorphic actuator 19 includes two layers of materials which have different coefficients of thermal expansion, such as a layer of nickel 32 (or copper) disposed on silicon, and the metal layer has a larger coefficient of thermal expansion than silicon. The thin film resistive heater 33 is formed on the silicon substrate 14 in the desired pattern by similar techniques as described elsewhere herein relative to resistive heaters 26 used for the in-plane microactuators 15 and 16.

In order to facilitate electrical stimulation of the bimorphic actuators, bonding pads 18 (FIG. 4A), typically comprised of a conductive material, such as gold, can be formed on opposed end portions of the bimorphic actuator 19 such that an electrical current can be established therebetween via leads 2" connected to a power supply (not shown). Then, referring again to FIG. 6A, the metallic layer 32 can be deposited on the silicon 14 and thin film heater 33 by a variety of methods, including preferential sputtering, directed evaporation, and electroplating, with departing from the spirit and scope of the present invention.

Figure 6B:
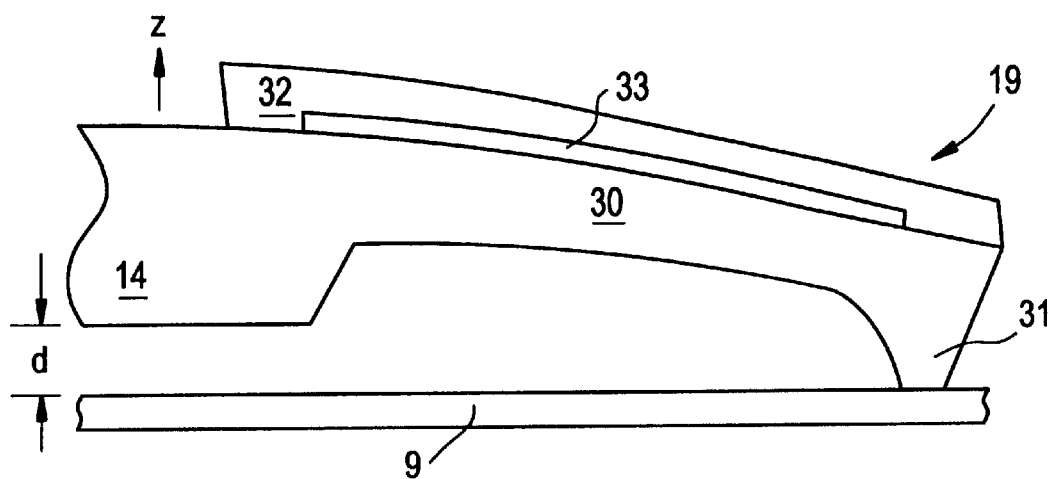
FIG. 6B is a cross section of the z-axis bimorphic micro-actuator used in the micro-aligner subsystem shown in FIG. 6A taken along line A–A' of FIG. 6B when the z-axis actuator is activated.

FIG. 6B is a cross section of the z-axis microactuator of z-axis actuator taken along lone A–A' of FIG. 4B when the z-axis actuator is activated by inducing thermal stimulation through resistive heater 33. Upon heating via thin film resistive heater 33, the distal end 31 of the diaphragm 30 is caused to deflect downward, which, in turn, creates a counterforce pushing upward the carrier 14 (via diaphragm 30) a displacement distance 'd'0 in the z-direction which effectively displaces the lens 105 positioned thereon in the z-direction. In this embodiment, the micro-aligner 10 includes current supply means for providing current to the resistive heater 33 of bimorphic actuator 19. In one embodiment, this can be accomplished by leads 2" extending to respective pins disposed within the connector housing 101, similar to that described in U.S. Pat. No. 5,606,635 in the context of a opto-electronic package, which teachings are incorporated herein by reference.

In this embodiment, the amount of the deflection of bimorphic actuator 19 is proportional to the magnitude of the electrical stimulation. By therefore controlling the current supplied to the bimorphic actuator 19, the amount of the bending or deflection and, consequently, the position of the carrier 14 relative to the base 9 can be controlled since the amount of bending is generally proportional to the current supplied to the resistive heater of the bimorphic actuator. Sufficient resistive heating can be generally provided by relatively small amounts of the current, such as 10 mA, thereby reducing the power requirements for the microstructure 19 of this embodiment.

The micro-aligner 10 having the construction described above is able to displace lens 105 greater than 10 microns in any one of the x- or y-directions and displace a lens greater than 100 μm in the z-direction, at forces of >30 mN in the x- or y-directions and at a force of >100 mN in the z-direction, and a power of <1.0 watt. The movable carrier 14 can have a square or rectangular surface geometry, as indicated in FIG. 4A, although it will be understood that the configuration of the carrier 14 is not limited thereto as long as the above functional requirements are met.

As an exemplary processing scheme for fabricating micro-aligner 10, fabrication of the micro-aligner carrier chip begins with definition of a PECVD silicon nitride layer 14" (see FIG. 4A) on a silicon wafer, to provide carrier substrate 14, which are later etched via bulk etching to form the cantilever shaped z-axis actuator 19 and the thinned substrate diaphragm regions 28 (by etching recesses into the backside of the carrier 14) at areas below the resistive heaters 26 and thermally actuated arch beam actuators 15 and 16. A low stress PECVD silicon nitride layer patterned on both sides of the silicon wafer is used for this purpose. As is known in the art, the silicon nitride layer forms a base layer which adds strength to the structure as well as a chemical barrier or etch-stop layer.

The surface micromachine layers are then patterned to form the thermal isolation structures and microheaters for the thermally actuated beam actuators 15 and 16. A thick electroplated nickel layer is patterned using the LIGA (German acronym which translates to Lithography, Plating, and Molding) technique. As known to those skilled in the art, LIGA processes are based on a combination of lithography, electroforming and molding. In fact, the acronym LIGA is derived from the German translation of lithography, electroforming and molding, namely, Lithography, Galvanoformung and Abformung. Advantageously, LIGA processes may be used to obtain relatively large height-to-width ratios which permit fabrication with precise tolerances. Thus, this step relies upon synchrotron based deep x-ray lithography.

A key aspect of LIGA patterning is the ability to define high aspect ratio structures, which is crucial for obtaining actuation in the plane of the carrier chip and for defining corresponding spring structures with high in plane compliance. LIGA also permits plating heights which are sufficiently thick to form passive fixturing guides for the fiber, precise edge reference structures, and provides convenient definition of conductor paths for actuator control input. Optical lithography ensures excellent alignment of reference structures with fiber guides and thereby provides assembly alignment accuracy within the capture range of the microactuators.

Following LIGA patterning, the movable portions of the nickel structures are released via sacrificial etching. That is, after forming the nickel structures in the surface of carrier 14 via LIGA, a chemical etch undercuts are provided to selectively release nickel structures from the carrier 14. By properly timing the etch, some nickel structures are completely undercut and, thus, released, while others remain attached to the substrate. In a preferred embodiment of the present invention, fixed structures, e.g., features 3, 3', 18, 21, and 22 in FIG. 4A, remain attached to substrate 14 while other structures such as arches 23 and beams 25, 25' of in-plane microactuators 15 and 16 are released by undercut etching. This result can also be accomplished by using a masked sacrificial layer.

The bulk silicon wafer of substrate 14 is then subjected to anisotropic etching to cut away portions of the substrate 14 located below diaphragm area 28 (FIG. 5) and thermally relieve the polysilicon heaters 26, using the silicon nitride layer as an etch stop. According to the invention, etching performed on the bottom side of substrate 14 stops at nitride layer 14" which forms the diaphragm 28 on the top surface of substrate 14. Advantageously, this arrangement thermally isolates heater 26 from the other components of micro-aligner 10 and the alignment housing 17. For example, by thermally isolating lens 105 from heater 26, lens 105 may be maintained at a desired temperature to prevent temperature fluctuation from altering or otherwise affecting its alignment. In addition to providing thermal isolation, the etching causes a greater percentage of the heat provided by heater 26 to be transferred to actuator 15 or 16. As a result, actuators 15 and 16 have improved deflection response and efficiency. The resulting process merges surface and bulk silicon micromachining with nickel surface micromachining via the LIGA technique.

The most real estate taken up by the anisotropic bulk micromachining is attributable to making the heaters and relief of the z-actuator. These area requirements can be eliminated by using Reactive ion etching (RIE) of the silicon which can achieve through wafer etching with aspect ratios of 40:1. The micro-aligner 10 can require on the order of 1 mm$^2$ of real estate, meaning thousands of micro-aligners such as described herein can be formed per wafer surface.

Following wafer level fabrication, the individual micro-aligner devices are separated from each other using conventional dicing, and then they can be packaged as described herein.

As shown in FIG. 1, one or more micro-aligners 10, each supporting a respective lens 105, can be disposed within the fiber optic connector 101 to permit concurrent optical coupling of a plurality of input optical fibers with a plurality of output fibers, such as could useful or needed in the context of two spliced composite structural parts having embedded fiber optics. The micro-aligners 10 can precisely simultaneously provide aligned coupling of multiple input and output optical fiber pairings from two composite parts with respective lens elements of the fiber optic connector in order to collimate the optical signals transmitted therethrough.

In view of the above, it will be, seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

For example, it will be appreciated that the fiber optic connector of this invention can employ any three-axis micro-aligners meeting the performance and physical requirements outlined herein, and the micro-aligners are not limited to only those exemplified herein with reference to FIGS. 4A, 4B, 5 and 6. For example, the three-axis microactuators described in U.S. Pat. No. 5,602,955, which teachings are incorporated herein by reference, alternatively could be employed as the micro-aligner (feature 10 in FIG. 1) used to align the lens element with the optical fibers to be coupled according to this invention.

What is claimed is:

1. A fiber optic connector, comprising:
   a connector housing having a base side, first and second sidewalls upstanding from the base side that are spaced apart in relation to each other, and said first sidewall defining at least one aperture through which optical signals can be transmitted by an input optical fiber located outside the housing and said second sidewall defining at least one aperture through which optical signals can be transmitted to an output optical fiber located outside the housing, where the optical fibers are fixed in position in relation to the housing;
   a unitary optical lens element contained within the housing and located between the housing apertures, wherein the optical lens is comprised of two segments optically bonded along confronting respective lens segment surfaces at an oblique angle effective to transmit collimated light from the input fiber to the output fiber and reflect transmitted light that is reflected back from the output fiber to a photodetector integrally attached to the lens element and positioned so as to receive the light so reflected from the confronting respective lens segment surfaces; and
   a micro-aligner contained within the housing and attached to the housing, wherein the micro-aligner holds the lens element, and the micro-aligner induces movement to the lens element in a set of three orthogonal directions to controllably position the lens element relative to either one of the input or output fibers.

2. A fiber optic connector as in claim 1, wherein said micro-aligner further comprises:
   a stationary alignment housing comprising a base and four housing sidewalls upstanding from said base defining a rectangular-shaped recess;
   a carrier having a surface plane and holding the lens element to be positioned in alignment with one of the respective input or output optical fibers, and where said carrier is positioned within said recess defined by the stationary alignment housing;
   first and second microactuators provided on the carrier for effecting in-plane alignment of the lens element with said one of the respective input or output optical fibers in either or both of the two orthogonal in-plane directions in which said in-plane microactuators, when either is activated, exerts a force on a housing sidewall of said alignment housing sufficient to overcome the normal and opposite biasing force created by first and second respective associated biasing means included on said carrier to cause movement of the carrier in one of the in-plane directions, where said first and second biasing means are provided on opposite sides of said carrier relative to said first and second in-plane microactuators, respectively, with each said biasing means biased against the stationary alignment housing to thereby impose opposing counter forces against which the respective first and second in-plane microactuators on the carrier must act and overcome to cause said in-plane movement of said carrier, and further including first and second backstops located on the carrier in respective association with each of the first and second microactuators, delimiting the amount of return in-plane movement of the associated first or second microactuator after either of the respective first or second microactuator is de-activated;
   and a third microactuator provided on the carrier which, when activated, effectively deflects the carrier, and thus the lens element, upward in a direction away from the base.

3. The system of claim 2, wherein the carrier includes a lens element holding means selected from the group consisting of an optic groove and a LIGA channel, for receiving the lens element and for maintaining the lens element in a fixed relation to the carrier.

4. The fiber optic connector of claim 1, wherein said lens element is a graded index lens element.

5. The fiber optic connector of claim 1, further comprising:

said connector housing defining a plurality of apertures in each sidewall through which optical signals can be transmitted by input optical fibers through a first sidewall of the housing and to output optical fibers located in fixed positions outside the opposite sidewall of the housing;

a plurality of lens elements disposed co-linearly within the housing with each lens element disposed between two opposing apertures in the sidewalls for optical coupling of optical fibers fixed outside the apertures; and a plurality of micro-aligners for precisely aligning the lens elements with respective optical fibers, wherein each micro-aligner holds one of the lenses, and each micro-aligner induces movement to the associated lens in three orthogonal directions to controllably position each lens element relative to a respective optical fiber.

6. The fiber optic connector of claim 2, wherein said third microactuator has a first layer of a first material superposed in contact on a second material where said first and second layers respond differently to electrical stimuli so that the third microactuator is deflected in a third direction orthogonal to the two in-plane directions by the electrical stimuli and operably urged against a portion of the carrier thereby moving the carrier in the third direction.

7. The fiber optic connector of claim 2, wherein the carrier includes an LIGA channel or defined groove therein for receiving the lens element and for maintaining the lens element in a fixed relation to the carrier.

8. The fiber optic connector of claim 1, wherein the connector housing comprises a hermetically sealed connector housing.

9. A method of fabricating a fiber optic connector, comprising the steps of:

providing a connector housing having a base side, a pair of sidewalls upstanding from the base side that are spaced apart in relation to each other, and each said sidewall defining at least one aperture;

disposing a unitary optical lens element within the housing as located between the housing apertures, wherein the optical lens is comprised of two segments optically bonded along confronting respective lens segment surfaces at an oblique angle effective to be able to transmit collimated light from the input fiber to the output fiber and reflect transmitted light reflected back from the output fiber to a photodetector integrally attached to the lens element and positioned to receive light reflected from the confronting respective lens segment surfaces;

disposing a micro-aligner within the housing and attached to the housing, wherein the micro-aligner holds the lens element, and the micro-aligner induces movement to the associated lens element in three orthogonal directions;

positioning an input optical fiber adjacent one aperture and an output optical fiber adjacent another aperture in the opposite sidewall of the housing such that outer end portions of the lens elements face a respective end of one of the optical fibers;

fixing the optical fibers in position in relation to the housing; and controllably positioning the lens element in three orthogonal directions relative to one of the input and output optical fibers such that optical signals transmitted by the aligned optical fibers can be effectively collimated by the lens elements for efficient coupling between the optical fibers.

10. The method of claim 9, wherein said provided micro-aligners each is comprised of:

(i) a stationary alignment housing comprising a base and four housing sidewalls upstanding from said base defining a rectangular-shaped recess;

(ii) a carrier having a surface plane and holding the lens element to be positioned in alignment with one of the respective input or output optical fibers, and where said carrier is positioned within said recess defined by the stationary alignment housing;

(iii) first and second microactuators provided on the carrier for effecting in-plane alignment of the lens element with said one of the respective input or output optical fibers in either or both of the two orthogonal in-plane directions in which said in-plane microactuators, when either is activated, exerts a force on a housing sidewall of said alignment housing sufficient to overcome the normal and opposite biasing force created by first and second respective associated biasing means included on said carrier to cause movement of the carrier in one of the in-plane directions, where said first and second biasing means are provided on opposite sides of said carrier relative to said first and second in-plane microactuators, respectively, with each said biasing means biased against the stationary alignment housing to thereby impose opposing counter forces against which the respective first and second in-plane microactuators on the carrier must act and overcome to cause said in-plane movement of said carrier, and further including first and second backstops located on the carrier in respective association with each of the first and second microactuators, delimiting the amount of return in-plane movement of the associated first or second microactuator after either of the respective first or second microactuator is de-activated; and (iv) a third microactuator provided on the carrier which, when activated, effectively deflects the carrier upward in a direction away from the base.

11. The method of claim 10, wherein said of controllably positioning the lens element comprises positioning the lens element held on the carrier relative to the optical fiber by actuating one or more of the first, second, and third microactuators, analyzing the reflected light received by the photodetector, and precisely aligning the lens element with the optical fiber based on the reflected light analyses.

* * * * *